US012583723B2

(12) United States Patent
Landstorfer et al.

(10) Patent No.: US 12,583,723 B2
(45) Date of Patent: Mar. 24, 2026

(54) CLOSING APPARATUS FOR CLOSING A CONTAINER WITH A CONTAINER CLOSURE AND METHOD FOR MONITORING A CLOSING APPARATUS

(71) Applicant: KRONES AG, Neutraubling (DE)

(72) Inventors: Maximilian Landstorfer, Neutraubling (DE); Markus Schoenfelder, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 18/942,144

(22) Filed: Nov. 8, 2024

(65) Prior Publication Data

US 2025/0153989 A1 May 15, 2025

(30) Foreign Application Priority Data

Nov. 10, 2023 (DE) ..................... 10 2023 131 292.8

(51) Int. Cl.
*B67B 3/00* (2006.01)
*B67B 3/20* (2006.01)
*B67B 3/26* (2006.01)

(52) U.S. Cl.
CPC ............ *B67B 3/268* (2013.01); *B67B 3/2013* (2013.01); *B67B 3/2066* (2013.01); *B67B 3/264* (2013.01)

(58) Field of Classification Search
CPC ..... B67B 3/268; B67B 3/2013; B67B 3/2066; B67B 3/264; B67B 3/2033; B67B 3/20
USPC ... 53/285, 317, 331.5, 381.4, 492, 471, 306, 53/319
See application file for complete search history.

(56) References Cited

U.S. PATENT DOCUMENTS 5,851,042 A 12/1998 Bankuty et al.
2003/0196519 A1* 10/2003 Graffin .................. B67B 3/2073 81/3.2
2009/0133537 A1* 5/2009 Uglum .................... B67B 7/162 81/3.56
2012/0222387 A1* 9/2012 Forestelli ................ B67B 3/261 700/283
2015/0175289 A1* 6/2015 Zumbach .............. B65B 7/2835 53/492

(Continued)

FOREIGN PATENT DOCUMENTS

DE 10 2021 127 195 A1 4/2023
DE 10 2021 132 348 A1 6/2023
EP 0 876 991 B1 8/2003

(Continued)

OTHER PUBLICATIONS

Extended European Search Report dated Mar. 28, 2025, from European Patent Application No. 24 212 068.1, 7 pages.

(Continued)

*Primary Examiner* — Jacob A Smith
(74) *Attorney, Agent, or Firm* — Haynes and Boone, LLP

(57) ABSTRACT

A closing apparatus for closing a container with a container closure, for example for closing a container with a screw cap in a beverage filling plant, includes a gripping mechanism for gripping the container closure with at least one gripping arm pivotable about a bearing, an actuating unit for actuating the gripping mechanism, and a detection unit for detecting a stroke of a stroke element of the actuating unit acting on the gripping mechanism. A corresponding method is also described.

20 Claims, 6 Drawing Sheets

(56) References Cited

U.S. PATENT DOCUMENTS

2015/0360800 A1* 12/2015 Shelander ............... B65B 61/06
53/399

FOREIGN PATENT DOCUMENTS

| | | | |
|---|---|---|---|
| EP | 1 908 725 | B1 | 12/2009 |
| JP | H11-124 196 | A | 5/1999 |
| WO | WO 2003/089360 | A1 | 10/2003 |
| WO | WO 2017/182453 | A1 | 10/2017 |

OTHER PUBLICATIONS

Search Report dated Sep. 18, 2024, from German Application No. 10 2023 131 292.8, 7 pages.

* cited by examiner

CLOSING APPARATUS FOR CLOSING A CONTAINER WITH A CONTAINER CLOSURE AND METHOD FOR MONITORING A CLOSING APPARATUS

CROSS-REFERENCE TO RELATED APPLICATIONS

This application claims priority from German Patent Application No. DE 10 2023 131 292.8, filed on Nov. 10, 2023 in the German Patent and Trademark Office, the disclosure of which is incorporated herein by reference in its entirety.

BACKGROUND

Technical Field

The present invention relates to a closing apparatus for closing a container with a container closure, for example for closing a container with a push-on closure or a screw cap in a beverage filling plant, and to a method for monitoring a closing apparatus for closing a container with a container closure, for example for closing a container with a push-on closure or a screw cap in a beverage filling plant.

Related Art

Closing apparatuses for closing containers with a container closure are well known from the prior art. For example, a container closure fed in via a picking wheel is gripped by the clamping jaws of a gripping mechanism of the picking wheel and then held on the closing apparatus by means of the gripping mechanism. The closer head of the closing apparatus, which holds the container closure, is then positioned over the container to be closed and lowered onto it in order to close the container with the container closure. When a screw cap is to be applied to the container, the closer head undergoes a rotating movement in addition to the lowering movement. The combination of lowering and rotating allows the screw cap to be screwed onto the container.

Furthermore, the prior art provides systems that allow the closure-related components of the closing apparatus, for example parts of the gripping mechanism, to be interchangeable in order to allow the same closer head to apply container closures of different geometries. Swapping over these components is labor-intensive.

EP 0 876 991 B1 shows an apparatus for screwing a cap onto a container neck, which apparatus has gripping means pivotable about horizontal axes, which gripping means are provided with clamping jaws for clamping the cap. A similar construction is shown in a screwing and rolling head for attaching threaded lids, which is known from EP 1 908 725 B1.

U.S. Pat. No. 5,851,042 A shows a clamping bushing for gripping container lids, which can be quickly changed by means of a locking bolt on a closure gripping system. To clamp the container lid, the segments of the clamping bushing are bent inward by means of a pressure cylinder to allow the container lid to be gripped.

The gripping mechanism of a closing apparatus can be operated by an actuating unit. For example, the gripping mechanism can be pretensioned in a certain position and moved to another position, for example an open position, by the actuating unit.

The gripping mechanism, more precisely its mechanics and/or pneumatics or hydraulics, is subject to wear, for example due to abrasion as a result of relative movements or when gripping and holding the container closure. Due to wear, the mechanically predetermined switching times of the gripping mechanism change over time, so that, relative to one closing apparatus, the times at which the container closure is gripped and released can deviate from the intended time, and relative to a plurality of closing apparatuses of a container closing apparatus, the switching times can increasingly deviate from one another.

In addition, when setting up a container closing apparatus comprising a plurality of closing apparatuses, the gripping mechanism is parametrized the same across all closing apparatuses or closing heads and must be readjusted and changed when the type is changed. Even within the closing apparatuses of a container closing apparatus, different actual closing times and opening times can occur even when the control times have been set to the same value, for example due to pneumatic lines of different lengths, line losses and/or tolerances or dimensional deviations in mechanical parts.

SUMMARY

An improved closing apparatus for closing a container with a container closure, for example for closing a container with a push-on closure or a screw cap in a beverage filling plant, and a corresponding method are described herein according to various embodiments.

Accordingly, a closing apparatus for closing a container with a container closure, for example for closing a container with a push-on closure or a screw cap in a beverage filling plant, is proposed, comprising a gripping mechanism for gripping the container closure with at least one gripping arm pivotable about a bearing and an actuating unit for actuating the gripping mechanism.

More specifically, the actuating unit can be set up to actuate at least one gripping arm of the gripping mechanism, for example to pivot at least one gripping arm, in other words to control a pivoting position of at least one gripping arm.

According to the invention, the closing apparatus further comprises a detection unit for detecting a stroke of a lifting element of the actuating unit acting on the gripping mechanism.

By detecting the stroke, various parameters can be determined, which in turn allow conclusions to be drawn, for example, about the actual switching times of the gripping mechanism. This can in turn be used to achieve a higher system performance of a container closing apparatus comprising the closing apparatus. The detected stroke can also be used to obtain information regarding state monitoring of the closing apparatus, in particular regarding the parts of the gripping mechanism.

By processing the measured stroke, parameters of the closing apparatus, such as the closing time and the opening time, can be determined automatically depending on the type of container closure currently being processed.

Detecting the stroke also allows conclusions to be drawn about current wear of the closing apparatus, in particular if the currently determined stroke, in particular the stroke at the time of closing and/or at the time of opening of the gripping mechanism, is compared with values recorded initially, for example during or shortly after setup. Accordingly, it is possible to determine wear limits in order to plan or initiate a replacement of parts of the closing apparatus that are subject to wear.

In addition, stroke detection can be used to detect system errors in the programming, mechanics and/or pneumatics of the closing apparatus and/or the container closing apparatus comprising it.

The recorded stroke values can also be used to determine further data for the digitalization of the closing process.

The closing apparatus can optionally comprise an evaluation unit for determining at least one of the above parameters. Alternatively, the container closing apparatus can also comprise such an evaluation unit. Furthermore, as an alternative, a centralized plant control of a container treatment plant can be provided.

According to one embodiment, the detection unit can comprise at least one sensor, for example a contactlessly measuring sensor. This can be, for example, a displacement sensor, for example in the form of a Hall sensor.

According to one embodiment, the actuating unit can be configured as an actuating cylinder. In this case, the stroke element can be a cylinder piston of the actuating cylinder.

To make it easier to detect the stroke, a reference element that optionally extends perpendicular to the stroke direction of the stroke element can be arranged on the stroke element. The reference element can serve as a reference for the sensor used. For example, a displacement sensor or distance sensor can measure the distance between itself and the reference element, wherein the stroke is based on or corresponds to the measured distance or a change in distance.

According to one embodiment, the closing apparatus can further comprise a control unit that is set up to determine at least one state variable of the gripping mechanism based on at least one signal from the detection unit.

The state variable can be indicative of wear of the gripping mechanism or correspond to wear of the gripping mechanism. In other words, the control unit can be set up to use the determined state variable to draw conclusions about the state and/or existing wear of the gripping mechanism and to use this state variable in turn as a data basis in order to, for example, issue a warning and/or control signals in response to the processing of the determined state variable.

According to one embodiment, the control unit can be set up to initiate an adjustment of at least one operating parameter of the closing apparatus on the basis of at least one signal from the detection unit and/or at least one determined state variable, wherein optionally at least one operating parameter is a control point and/or switching time for controlling the stroke element.

Accordingly, the proposed closing apparatus can be individually adapted. This is particularly advantageous when a plurality of gripping mechanisms or a plurality of closing apparatuses are provided on a container closing apparatus.

According to one embodiment, the control unit can be set up to output a message, for example a warning message, an error message and/or an information message, for example a status message, based on at least one signal from the detection unit and/or at least one determined state variable.

According to one embodiment, the gripping mechanism can comprise a control element that is displaceable in the direction of the stroke of the lifting element and that is coupled to the at least one gripping arm in order to control the position of the at least one gripping arm.

Furthermore, the closing apparatus can comprise a stroke unit for raising and lowering the gripping mechanism in a displacement direction.

Optionally, the stroke unit can comprise a fastening part for fastening to a transport unit of a container treatment apparatus and a moving part that is displaceable relative to the fastening part in a displacement direction, wherein the moving part is connected to the gripping mechanism. In this case, the moving part can comprise the actuating unit.

A particularly simple construction can be achieved if the displacement direction and the stroke direction of the stroke element are oriented in parallel, wherein a central longitudinal axis of the moving part and a central axis of the stroke element can be concentric with one another.

The above object is further achieved by a method for monitoring a closing apparatus for closing a container with a container closure, for example for closing a container with a push-on closure or a screw cap in a beverage filling plant, having the features of claim 11. Advantageous developments of the method result from the dependent claims and the present description and the figures.

Accordingly, a method is proposed for monitoring a closing apparatus for closing a container with a container closure, for example for closing a container with a push-on closure or a screw cap in a beverage filling plant, which closing apparatus comprises a gripping mechanism for gripping a container closure with at least one gripping arm pivotable about a bearing and an actuating unit for actuating the gripping mechanism.

According to the method, a stroke of a stroke element of the actuating unit acting on the gripping mechanism is detected.

The advantages and effects described with regard to the closing apparatus can analogously also be achieved by means of the method. A repeated description of them is omitted in order to avoid redundancies.

According to a further development of the method, at least one state variable of the gripping mechanism can be determined on the basis of the detected stroke.

According to a further development of the method, the state variable can be indicative of wear of the gripping mechanism or correspond to wear of the gripping mechanism.

According to a further development of the method, at least one operating parameter of the closing apparatus can be adjusted on the basis of the determined stroke and/or of at least one determined state variable, wherein optionally at least one operating parameter is a control point and/or switching time for controlling the stroke element.

According to a further development of the method, a message, for example a warning message, an error message and/or an information message, for example a status message, can be issued on the basis of the determined stroke and/or at least one determined state variable.

BRIEF DESCRIPTION OF THE FIGURES

Advantageous further embodiments of the invention are explained in more detail by the following description of the figures.

DETAILED DESCRIPTION

Advantageous exemplary embodiments are described below with reference to the figures. Identical, similar, or identically acting elements are provided with identical reference signs in the various figures, and a repeated description of these elements is in some cases omitted in order to avoid redundancies.

Figure 1:
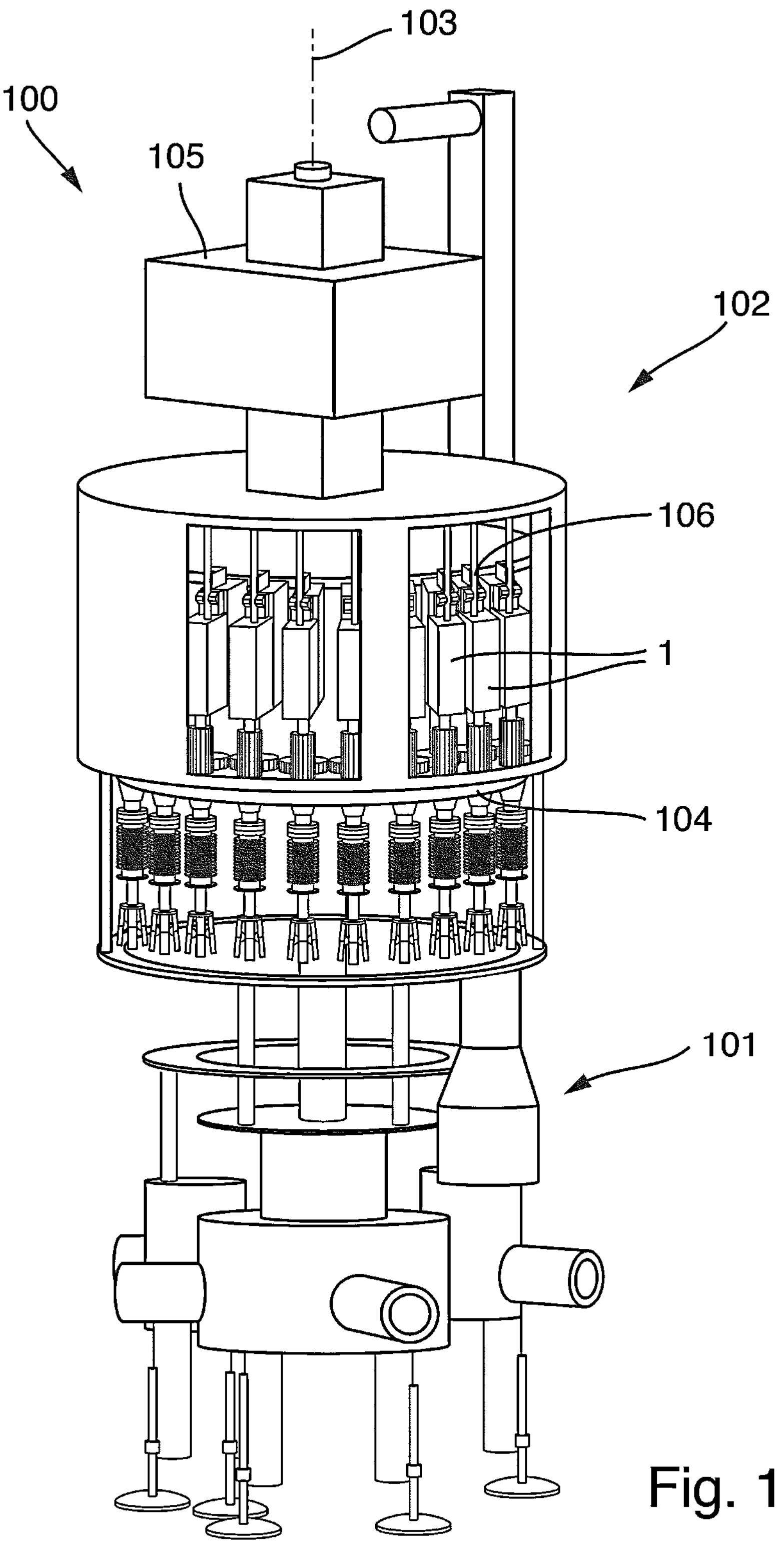
FIG. 1 is a schematic perspective side view of a container closing apparatus for closing containers, each with a container closure.

FIG. 1 is a schematic perspective side view of a container closing apparatus 100 having a rotary construction for closing containers with one container closure in each case.

The container closing apparatus 100 comprises a frame 101 on which a treatment carousel 102 is arranged so as to be rotatable about an axis of rotation 103.

The treatment carousel 102 comprises a plurality of closing apparatuses 1 for closing a container with a container closure, which closing apparatuses are arranged evenly spaced from one another on the circumference of the treatment carousel 102.

The container closure apparatus 100 comprises a sealing section 104, which serves as a separation between a treatment room configured as a clean room below the sealing section 104 and a gray room above the sealing section 104.

Figure 2:
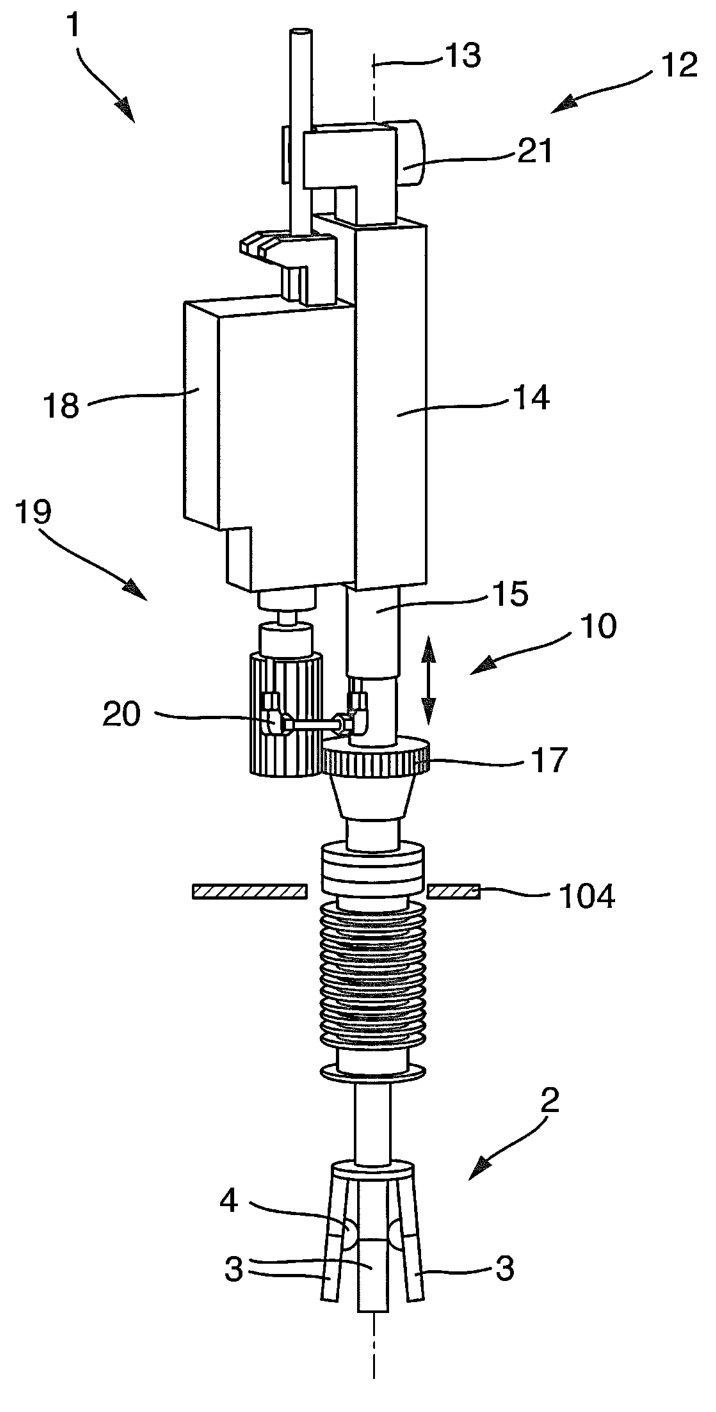
FIG. 2 is a schematic perspective side view of a closing apparatus of the container closing apparatus from FIG. 1.
Figure 3:
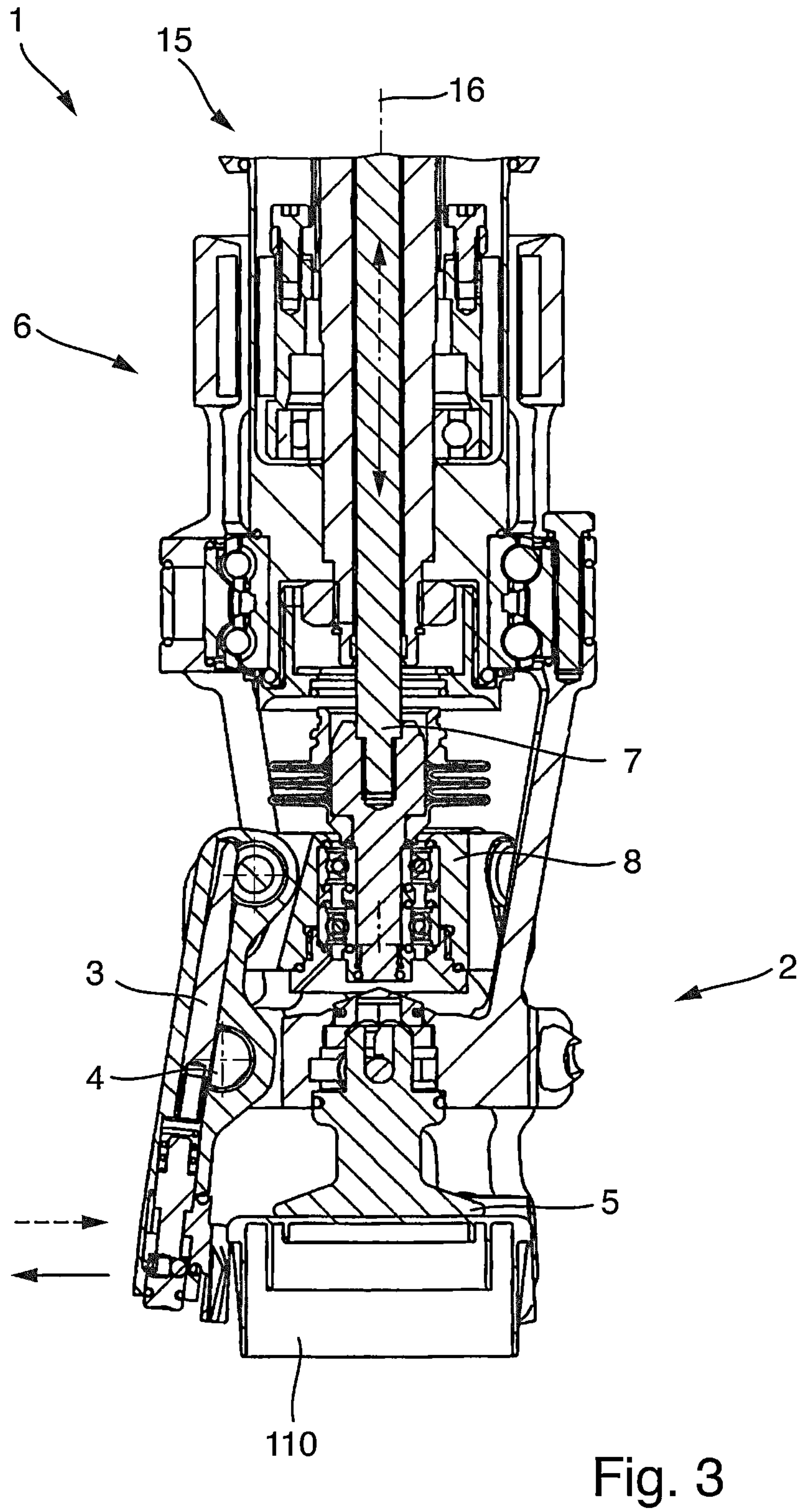
FIG. 3 is a sectional view through a lower part of the closing apparatus.

FIG. 2 is a schematic perspective side view of a closing apparatus 1 of the container closing apparatus 100 from FIG. 1. FIG. 3 is a sectional view through a lower part 17 of the closing apparatus 1.

The closing apparatus 1 is configured and set up to close a container with a container closure 110, in the present case to close a container with a screw cap 110, in a beverage filling plant. Said closing apparatus comprises a gripping mechanism 2 for gripping the container closure 110 with, in this case, three gripping arms 3, each of which is pivotable about a bearing 4.

Said closing apparatus further comprises an actuating unit 6 for actuating the gripping mechanism 2.

More precisely, the actuating unit 6 is configured and set up to actuate the gripping arms 3 of the gripping mechanism 2. The actuating unit 6 controls the pivoting of the gripping arms 3.

The closing apparatus 1 further comprises a detection unit 10 for detecting a stroke of a stroke element 7 (see FIG. 3) of the actuating unit 6 acting on the gripping mechanism 2, as explained in more detail below with regard to FIGS. 4 and 5.

The gripping mechanism 2 further comprises a control element 8 or coupling element that can be displaced in the direction of the stroke of the stroke element 7 and that is coupled with the gripping arms 3 to a control element for controlling the position of the gripping arms 3.

The gripping arms 3 are each pivotably mounted about the bearing 4. They are coupled to the stroke element 7 via the control element 8 in such a way that lowering the stroke element 7, i.e. moving the stroke element 7 in the direction of the space provided for receiving the container closure 110 between the gripping arms 3, as indicated by the continuous arrows in FIG. 3, causes the gripping mechanism 2 to open, i.e. causes the gripping arms 3 to pivot into an open position. Raising the stroke element 7, i.e. moving the stroke element 7 away from the space between the gripping arms 3 provided for receiving the container closure 110, as indicated by the dashed arrows in FIG. 3, therefore causes the gripping mechanism 2 to close.

The actuating unit 6 is configured as an actuating cylinder and the stroke element 7 is a cylinder piston.

The closing apparatus 1 comprises a stroke unit 12 for raising and lowering the gripping mechanism 2 in a displacement direction 13. The lifting unit 12 comprises a fastening part 14 for fastening to the treatment carousel 102, which constitutes a transport unit. It further comprises a moving part 15 that is displaceable relative to the fastening part 14 in the displacement direction 13. The moving part 15 is connected to or comprises the gripping mechanism 2 and also comprises the actuating unit 6. The position of the moving part 15 relative to the fastening part 14 is predetermined by a guide 106 on the frame 101, which guide is configured here as a link guide, on which a guide roller 21 arranged on the moving part 15 is guided.

According to this embodiment, the displacement direction 13 (see FIG. 2) corresponds to the stroke direction 16 of the stroke element 7. The stroke direction 16 and the displacement direction 13 are therefore oriented in parallel. In the present case, the displacement direction 13, which in this case constitutes a central longitudinal axis of the moving part 15, and the stroke direction 16, which in this case constitutes a central axis of the stroke element 7, are concentric with one another.

The container closure 110 is held radially by the gripping arms 3. At the front end, it is supported on a stop 5, via which a head pressure required for applying the container closure 110 to a container can also be applied.

As already mentioned above, the closing apparatus 1 is configured to apply a screw cap. Accordingly, a lower part 17 of the moving part 15 is configured to be rotatable about the displacement direction 13. The rotary movement is predetermined by a motor 18, in this case an electric motor, which is coupled to the rotatable part 17 of the moving part 15 via a gearing 19.

When configured to apply a push-on closure, the rotation function is omitted or blocked.

The movements of the stroke element 7 and thus the movements of the gripping arms 3 are controlled via a pneumatic connection 20.

Figure 4:
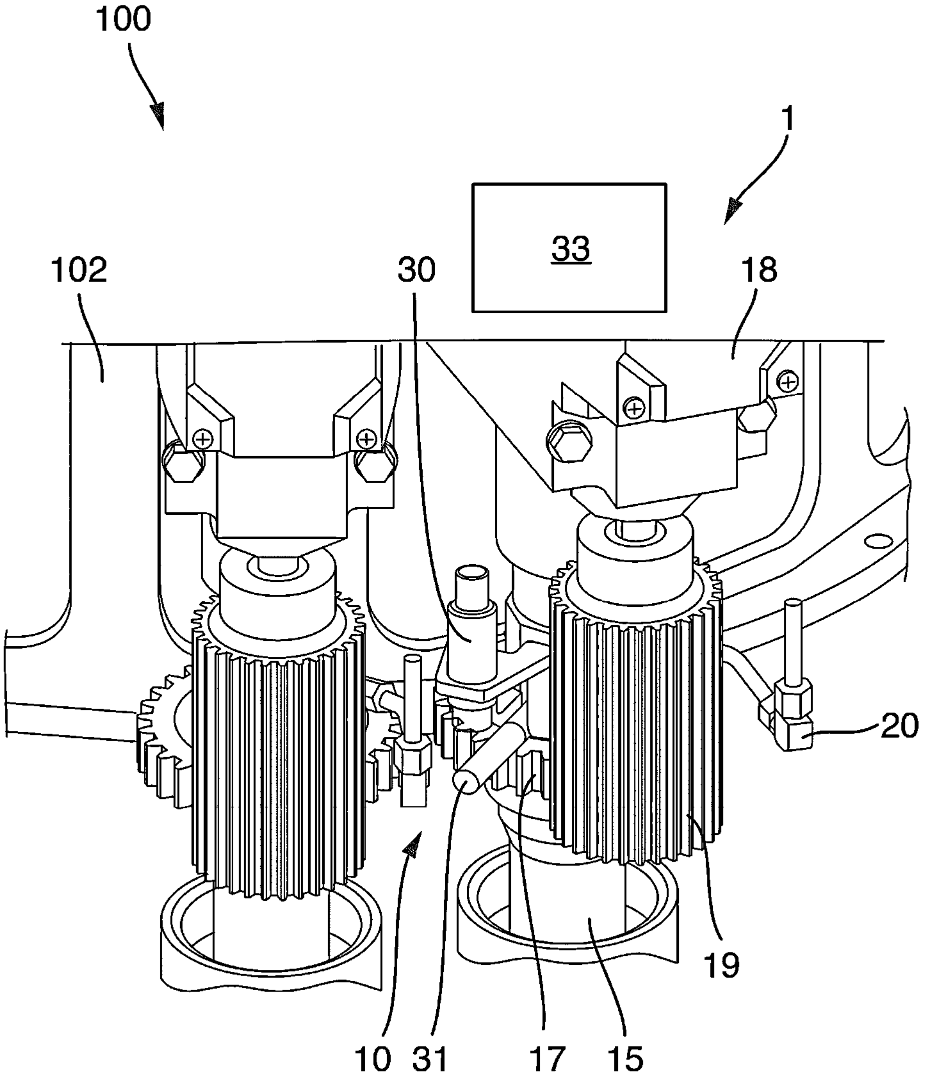
FIG. 4 is a schematic perspective detailed view of the closing apparatus.
Figure 5:
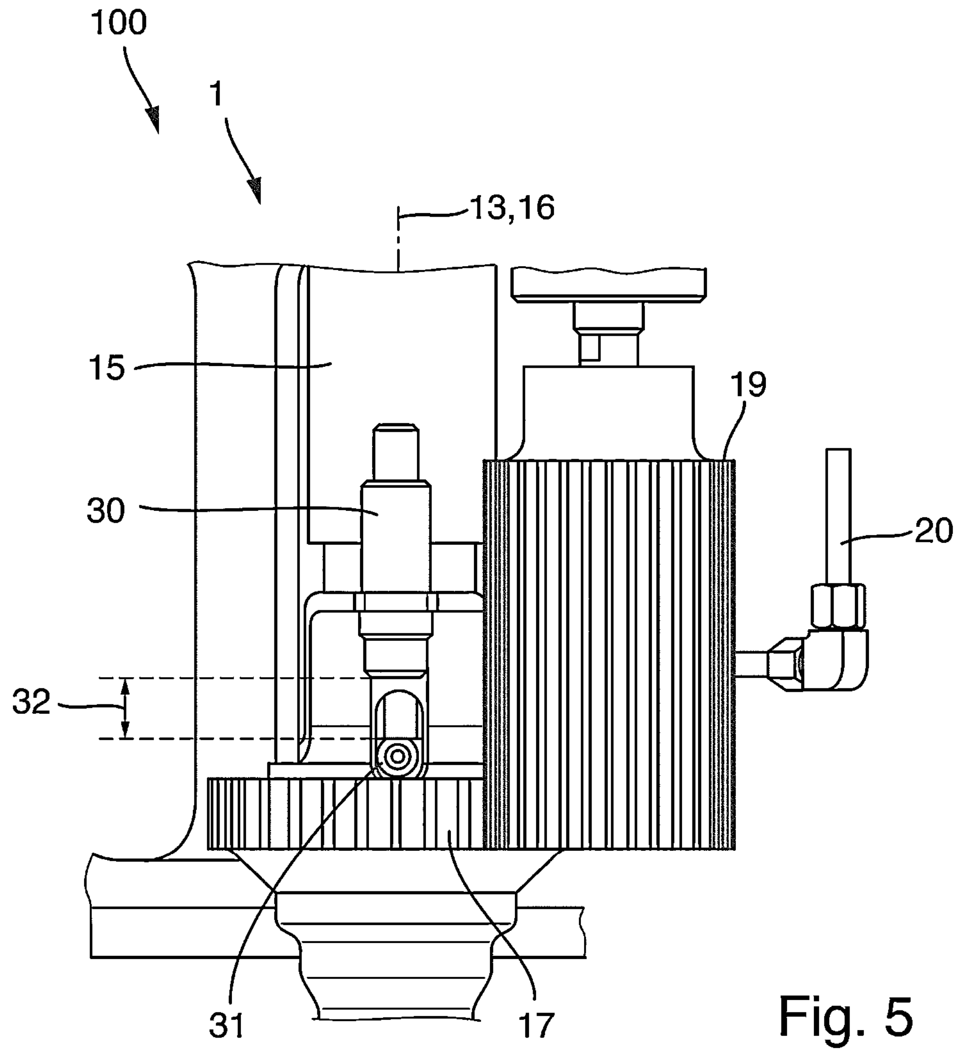
FIG. 5 is a further schematic view of the detail from FIG. 4.

FIG. 4 is a schematic perspective detailed view of the closing apparatus 1. FIG. 5 is a further schematic view of the detail from FIG. 4.

The detection unit 10 already mentioned above comprises a contactlessly measuring sensor 30, which in this case is optionally configured as a displacement sensor, according to this optional embodiment in the form of a Hall sensor.

The sensor 30 is set up to detect a path or distance 32 of the sensor 30 to a reference element 31.

The sensor 30 is arranged on the moving part 15, in which the stroke element 7 is displaceable relative to the moving part 15 (see FIG. 3).

The reference element 31 is arranged on the stroke element 7 oriented perpendicular to the stroke direction 16 of the stroke element 7.

The closing apparatus 1 further comprises a control unit 33, indicated schematically in FIG. 4, which is set up to determine at least one state variable of the gripping mechanism 2 based on at least one signal from the detection unit 10.

Here the state variable is indicative of wear of the gripping mechanism 2.

The control unit 33 is set up to initiate an adjustment of at least one operating parameter of the closing apparatus 1 based on at least one signal from the detection unit 10 and/or at least one determined state variable.

The operating parameter can be a control point and/or a switching time for controlling the stroke element.

The control unit 33 is further set up to output various messages, in this case warning messages, error messages and information messages, for example status messages, on the basis of at least one signal from the detection unit 10 and/or at least one determined state variable.

The control unit 33 or its functionality can alternatively also be at least partially integrated into a central controller 105 of the container treatment apparatus 100.

Figure 6:
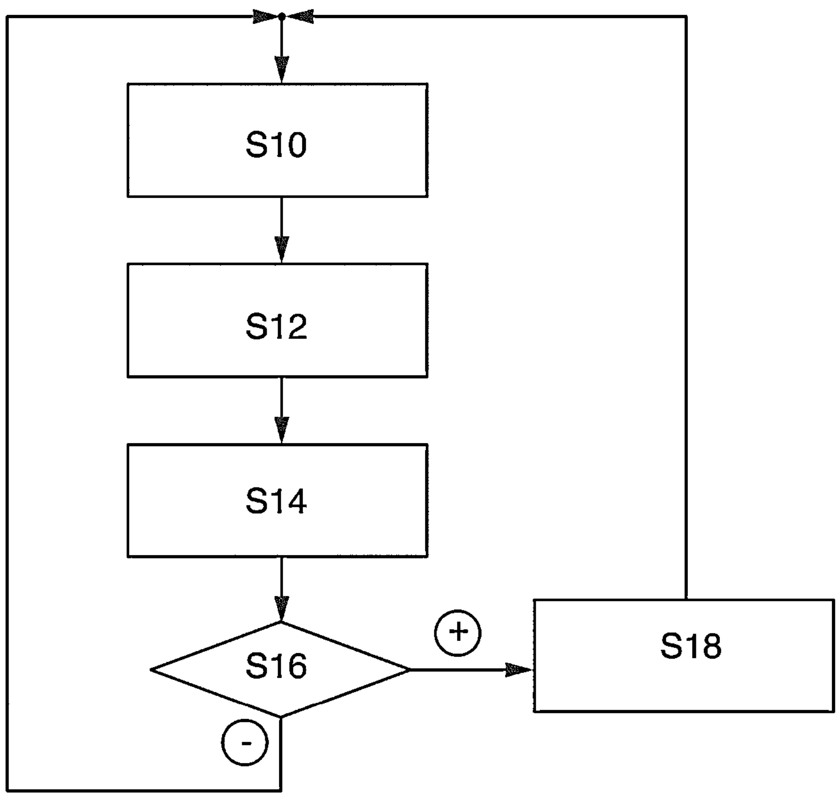
FIG. 6 is a schematic flow diagram of a method for monitoring the closing apparatus according to FIGS. 1 to 5.

FIG. 6 shows a method for monitoring the closing apparatus 1 for closing a container with a container closure according to the above-mentioned figures.

The method comprises, in a step S10, detecting the stroke of the stroke element 7 of the actuating unit 6 acting on the gripping mechanism 2.

In step S12, at least one state variable of the gripping mechanism 2 is determined based on the detected stroke.

The state variable is indicative of wear of the gripping mechanism.

In step S14, at least one operating parameter of the closing apparatus is adjusted based on the determined stroke and/or at least one determined state variable.

According to this embodiment, the operating parameters are a control point and a switching time for controlling the stroke element 7.

In step S16, a check is carried out to determine whether a message flag is to be activated on the basis of the determined stroke and/or at least one determined state variable. Depending on the activated message flag, a message, for example a warning message, an error message or an information message, in this case configured as a status message, is issued (S18).

To the extent applicable, any of the individual features set forth in the exemplary embodiments may be combined and/or interchanged, without departing from the scope of the invention.

What is claimed is:

1. A closing apparatus for closing a container with a container closure, comprising:

a gripping mechanism configured to grip the container closure with at least one gripping arm pivotable about a bearing;

an actuating unit configured to actuate the gripping mechanism; and a detection unit configured to detect a stroke of a stroke element of the actuating unit acting on the gripping mechanism.

2. The closing apparatus of claim 1, wherein the detection unit comprises a contactless measuring sensor.

3. The closing apparatus of claim 2, wherein the contactless measuring sensor comprises a displacement sensor.

4. The closing apparatus of claim 1, wherein the actuating unit comprises an actuating cylinder and the stroke element comprises a cylinder piston.

5. The closing apparatus of claim 1, wherein a reference element extending perpendicular to a stroke direction of the stroke element is arranged on the stroke element.

6. The closing apparatus of claim 1, further comprising a control unit configured to determine at least one state variable of the gripping mechanism based on at least one signal from the detection unit.

7. The closing apparatus of claim 6, wherein the at least one state variable is indicative of wear of the gripping mechanism or corresponds to wear of the gripping mechanism.

8. The closing apparatus of claim 6, wherein the control unit is further configured to initiate an adjustment of at least one operating parameter of the closing apparatus based on at least one signal from the detection unit and/or the at least one determined state variable.

9. The closing apparatus of claim 8, wherein the at least one operating parameter is a control point and/or a switching time for controlling the stroke element.

10. The closing apparatus of claim 6, wherein the control unit is further configured to output a message, based on at least one signal from the detection unit and/or the at least one determined state variable.

11. The closing apparatus of claim 1, wherein the gripping mechanism comprises a control element that is displaceable in a direction of the stroke of the stroke element and that is coupled to the at least one gripping arm to control a position of the at least one gripping arm.

12. The closing apparatus of claim 1, further comprising a stroke unit configured to raise and lower the gripping mechanism in a displacement direction, wherein the stroke unit comprises a fastening part configured to fasten to a transport unit of a container treatment apparatus and a moving part that is displaceable relative to the fastening part in the displacement direction.

13. The closing apparatus of claim 12, wherein the moving part is connected to or comprises the gripping mechanism and the actuating unit.

14. The closing apparatus of claim 13, wherein the displacement direction and the stroke direction are oriented in parallel, and a central longitudinal axis of the moving part and a central axis of the stroke element are concentric with one another.

15. A method for monitoring a closing apparatus for closing a container with a container closure, in which the closing apparatus comprises a gripping mechanism configured to grip the container closure with at least one gripping arm that is pivotable about a bearing, and an actuating unit configured to actuate the gripping mechanism, the method comprising:

detecting a stroke of a stroke element of the actuating unit acting on the gripping mechanism.

16. The method of claim 15, further comprising determining, based on the detected stroke, at least one state variable of the gripping mechanism.

17. The method of claim 16, wherein the at least one state variable is indicative of wear of the gripping mechanism or corresponds to wear of the gripping mechanism.

18. The method of claim 16, further comprising adjusting, based on the detected stroke and/or the at least one determined state variable, at least one operating parameter of the closing apparatus.

19. The method of claim 18, wherein the at least one operating parameter is a control point and/or a switching time for controlling the stroke element.

20. The method of claim 18, further comprising outputting, based on the detected stroke and/or the at least one determined state variable, a message.

* * * * *